(No Model.)

G. S. HULL.
UNDERGROUND CONDUIT FOR ELECTRICAL CONDUCTORS.

No. 343,458. Patented June 8, 1886.

Attest:
Court A. Cooper
A. E. Hansmann

Geo. S. Hull,
Inventor:
By Foster & Freeman
attys.

UNITED STATES PATENT OFFICE.

GEORGE S. HULL, OF ELMIRA, NEW YORK.

UNDERGROUND CONDUIT FOR ELECTRICAL CONDUCTORS.

SPECIFICATION forming part of Letters Patent No. 343,458, dated June 8, 1886.

Application filed November 3, 1885. Serial No. 181,760. (No model.)

*To all whom it may concern:*

Be it known that I, GEORGE S. HULL, a citizen of the United States, and a resident of Elmira, in the county of Chemung and State of New York, have invented certain new and useful Improvements in Underground Electrical Conducting Systems, of which the following is a specification.

My invention has for its object to prevent the loss of conductivity which results from the breaking of electrical conductors in test-boxes; and this object I secure by extending each conductor in an unbroken line through the test-box and there connecting it electrically with one or more fixed test-pins, so that the testing-wire may be applied to the test-pins to test the condition of each conductor in the ordinary manner.

My invention further consists in the construction of the box and pins, and in the means of connecting the test-pins and conductors.

Figure 1:
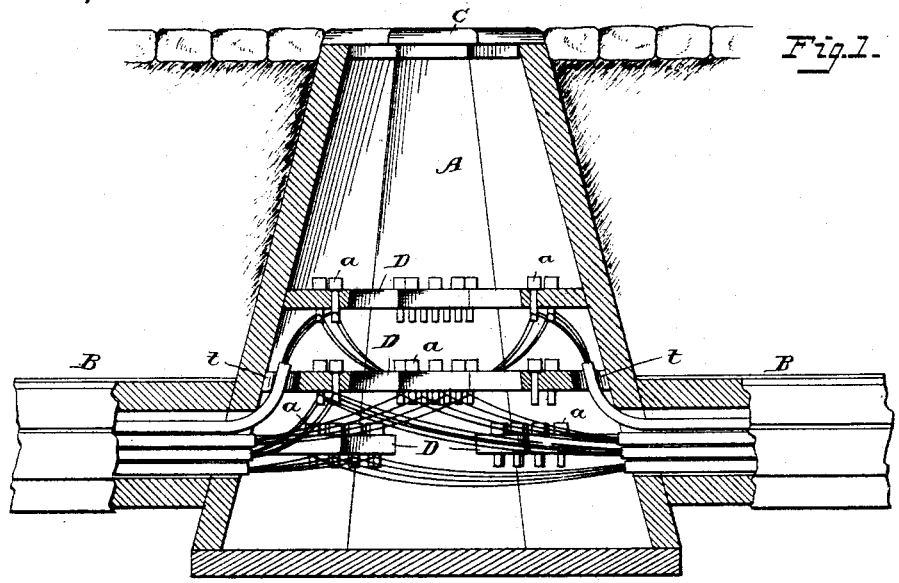
Figure 2:
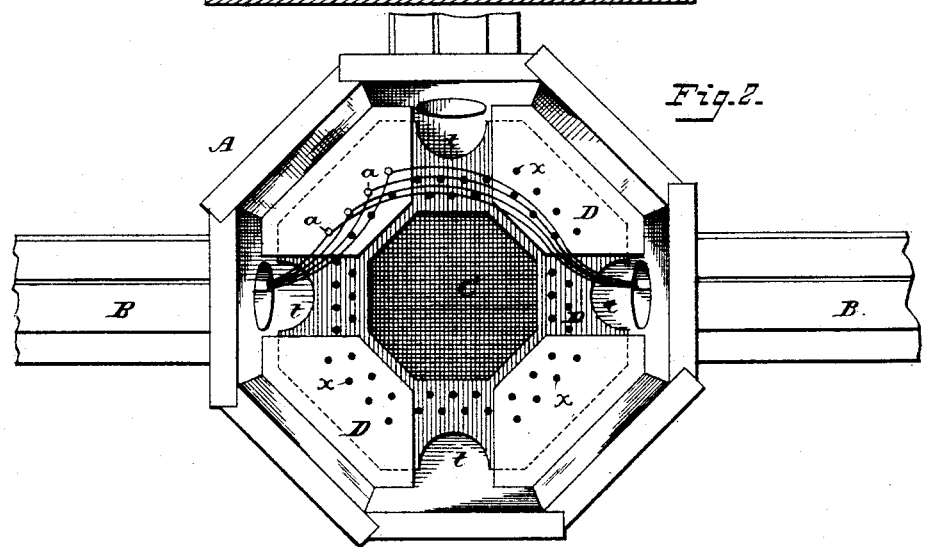
Figure 3:
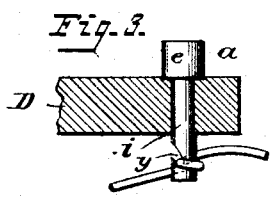

In the drawings, Figure 1 is a sectional elevation illustrating sufficient of an underground conducting system, test-box, and conduits to exhibit my invention. Fig. 2 is an inverted view of the parts shown in Fig. 1, the bottom of the test-box being removed. Fig. 3 is an enlarged view showing one of the shelves in section, a test-pin, and conductor connected therewith.

The man hole box A and the conduits or pipes B may be constructed of any suitable material and in any desired manner, but are preferably each built up of grooved strips or pieces arranged as indicated in Fig. 2, and more fully described in the application of A. Wyckoff for Letters Patent, executed October 19, 1885, Serial No. 180,651.

The man-hole box A is widest at the lower end, the upper contracted end being level, or thereabout, with the surface of the street, where it is provided with a cap, C, and the conduits B, two or more, as may be required, communicate each with the interior of the box A. In the conduits are arranged a series of separate wires, or a cable or series of cables, according to the character and extent of the system, the wires being insulated and bundled together in the cables within the conduit, but being separated within the box A, where they are connected with the testing-pins $a$. The testing-pins are fitted to sockets within the box A, preferably in shelves or flanges D, projecting from the sides of the box, each flange or section of flange having a series of sockets, $x$, into or through which the pins extend, and the said pins being preferably formed with heads $e$, stems $i$, and notches $y$.

It is well known that in the ordinary mode of connecting the different sections of the line by solder to the testing-pins there is a loss of conductivity, resulting from the resistance of the solder, or at the joint, which loss it is my object to prevent; and this object I effect by avoiding the breaking of any one of the lines, each line being extended through the test-box and in contact with a test-pin, or with two test-pins at opposite sides, but its continuity being preserved.

The connection between each line and the test pin or pins may be effected in different ways by exposing the conductor at the point where it is brought directly against the metal of the pins, where it may be soldered or clamped or otherwise held. For instance, the insulating material may be removed from the conductor at the point where it is to make contact with the pin, and the metallic portion of the conductor is placed in the notch $y$ in such position as to cross the pin below the plate or shelf D, thereby preventing the withdrawal or displacement of the pin, the conductor being soldered to the pin or otherwise secured. By this means, without breaking the continuity of the conductor, I am enabled to make ready contact therewith at one or more points, so as to test the line readily at any time, while I avoid the possibility of the breaking of the circuit either from defective joints or displacement of the test-pins.

While I have referred to the test-pins as separate from the conductors, they are not necessarily made of separate parts.

When the system embodies a large number of wires the test-box may be provided with two or more shelves or series of shelves, D, which are arranged within the box, one above the other; and in order to permit the conductors to be carried each to its proper shelf and pin without exposing the wires or separating them to too great an extent, I divide the upper shelves or perforate them, so as to leave spaces or openings $t$, through which the wires may be passed to positions above the lower shelves, as shown in Fig. 1. By this means I secure a large shelf area within a comparatively contracted space.

Without limiting myself to the precise construction and arrangement of parts shown, I claim—

1. The combination, with the test-box provided with a series of pins supported in fixed positions, of a series of wires extending in unbroken lines through the box, and each in electrical contact with one of said pins, substantially as set forth.

2. The combination of a test-box having one or more perforated shelves, pins fitting the perforations in said shelves, and conducting-wires extending in unbroken lines through the box, and each connected to one of the pins, substantially as set forth.

3. The combination of a test-box provided with a series of shelves arranged one above the other and having perforations or recesses $t$, and a series of conductors extending in unbroken lines through the box to pins supported by the shelves, the conductors leading to the upper shelves passing through the recesses $t$, substantially as set forth.

4. The combination, with the test-box having perforated shelves, of test-pins provided with heads, stems, and with slots $y$ in the stems, substantially as and for the purpose described.

5. The combination of the test-box provided with perforated shelves, continuous conductors extending through the box, and notched pins supported by the shelves and supporting the conductors, substantially as set forth.

In testimony whereof I have signed my name to this specification in the presence of two subscribing witnesses.

GEO. S. HULL.

Witnesses:
S. C. TABER,
A. WYCKOFF.